United States Patent

McIver, Sr.

[15] 3,677,110
[45] July 18, 1972

[54] LATHE TURRET
[72] Inventor: Clement L. McIver, Sr., Wayland, Mass.
[73] Assignee: Methods Incorporated, Sudbury, Mass.
[22] Filed: July 29, 1970
[21] Appl. No.: 59,048

[52] U.S. Cl. ..............................74/813 L, 74/818, 74/824, 82/36 A
[51] Int. Cl. ..............................................B23b 29/32
[58] Field of Search..................74/826, 818, 813 L, 813 R, 74/824; 82/36 A; 279/5

[56] References Cited

UNITED STATES PATENTS 2,975,657  3/1961  Samuel...............................74/826 X
2,908,195  10/1959  Benes..................................74/826 X Primary Examiner—William F. O'Dea
Assistant Examiner—F. D. Shoemaker
Attorney—Kenway, Jenney and Hildreth

[57] ABSTRACT

In the lathe turret construction disclosed herein, indexing of the turret to bring successive tools into operating position is accomplished by a separate locking member which is axially slidable, relative to the turret spindle, between a locking position and a release position. The separate locking member includes means for preventing rotation with respect to a fixed frame of reference, independent of the member in which the turret spindle is journaled.

7 Claims, 4 Drawing Figures

PATENTED JUL 18 1972 3,677,110

INVENTOR
CLEMENT L. McIVER
BY Kenway, Jenney + Hildreth
ATTORNEYS

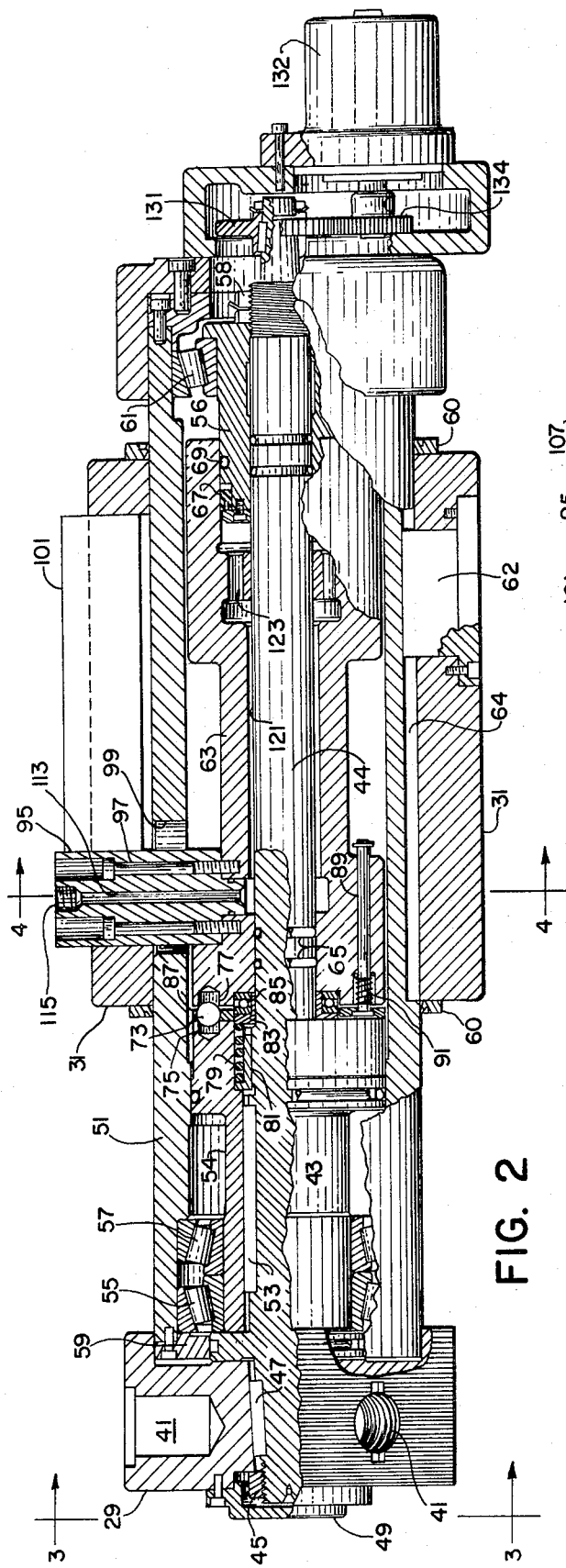
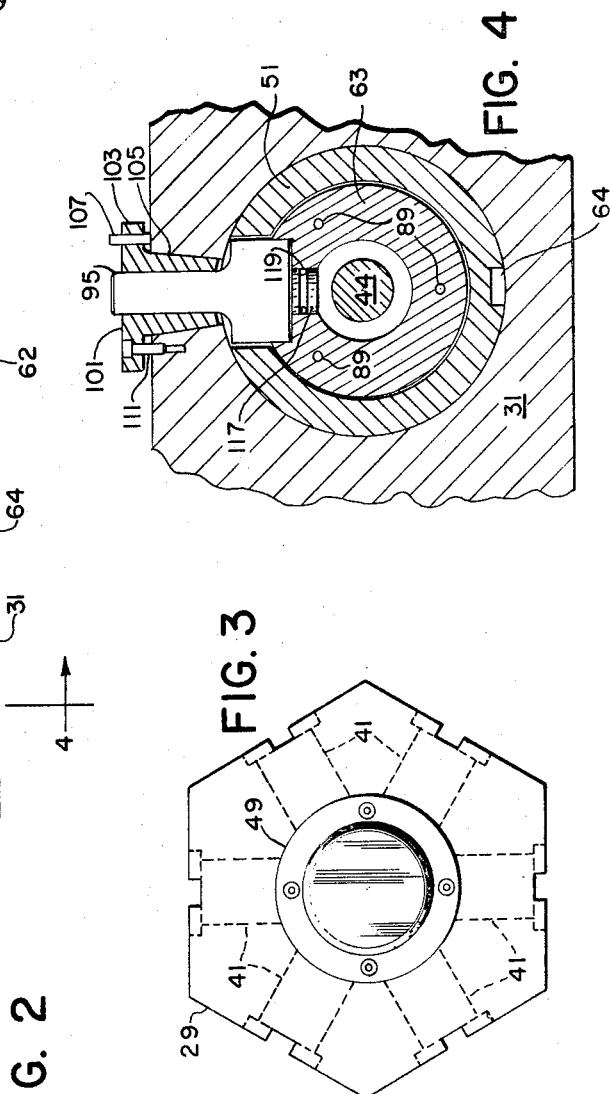

LATHE TURRET

BACKGROUND OF THE INVENTION

This invention relates to a lathe turret and more particularly to such a turret suitable for use in numerically controlled lathes providing exceptionally high precision.

In conventional turret lathes, the turret is indexed so as to bring successive tools into operating position by first displacing the turret axially, so as to move it out of engagement with a stationary locking member, and by then rotating it to bring the next tool into operating position. As the turret in such an arrangement must be journaled so as to permit both rotation and axial displacement, it has typically been difficult to provide great precision in tool positioning.

Among the objects of the present invention may be noted the provision of a lathe turret providing improved precision in tool positioning; the provision of a turret which may be rotated in either direction and which can move more than one tool position at a time; the provision of such a turret in which journaling of the turret spindle for compound motion is not required; the provision of such a turret which may rapidly operated; the provision of such a turret in which tool positioning accuracy does not deteriorate with use; the provision of such a turret which operates reliably and which is of relatively simple and inexpensive construction. Other objects and features will be in part apparent and in part pointed out hereinafter.

SUMMARY OF THE INVENTION

Briefly, the present invention provides means for accurately positioning a selected one of a plurality of operating elements or tools at a predetermined operating position. The individual tools or operating elements are held in a turret which is mounted on a spindle adapted for rotation around a predetermined axis. The spindle is journaled in a tube or other journal member for rotation only, axial movement of the spindle relative to the journal member being prevented. A locking member is provided which slides axially with respect to the spindle and which includes a plurality of locking surfaces adapted to interfit with corresponding surfaces on the spindle in each of a plurality of preselected angular positions corresponding to the positions of the various operating elements around the spindle axis. These surfaces prevent relative rotation of the spindle and locking member when the locking member is in a first axial position, relative rotational movement being permitted when the locking member is in a second axial position. The locking member also includes means for preventing rotation thereof with respect to a fixed frame of reference. Means are also provided for selectively moving the locking member between its first and second positions and for rotating the spindle to bring successive operating elements into the operating position.

BRIEF DESCRIPTION OF THE DRAWINGS

FIG. 2 is a plan view, with parts broken away, of a lathe turret assembly of the present invention. FIG. 3 is a section substantially on the line 3—3 of FIG. 2 and FIG. 4 is a section substantially on the line 4—4 of FIG. 2.

Corresponding reference characters indicate corresponding parts throughout the several views of the drawings.

DESCRIPTION OF THE PREFERRED EMBODIMENT

Figure 1:
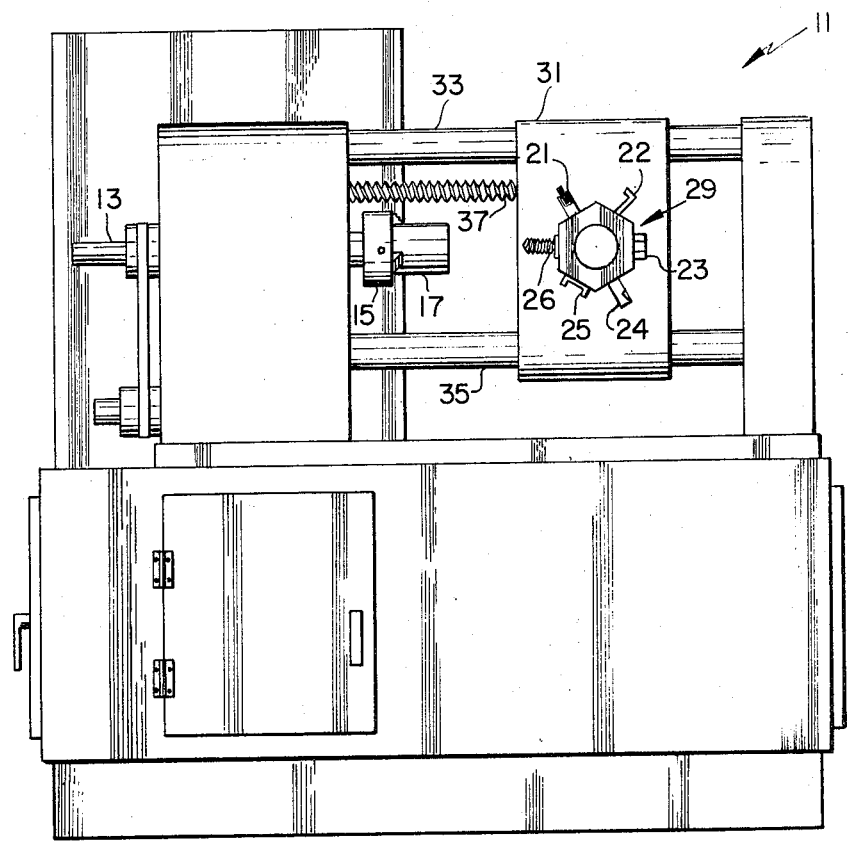
FIG. 1 is a front view of a turret lathe provided with a turret assembly constructed in accordance with the present invention, showing a preferred arrangement of the turret assembly in relation to the other elements of the lathe.

Referring now to FIG. 1, there is indicated at 11 a turret lathe of a type generally adapted for automatic operation, e.g., under numerical or so-called direct digital control. The main lathe spindle is indicated at 13 and carried a chuck 15 adapted to receive a workpiece as is indicated at 17. A plurality of tools 21–26 for operating on the workpiece are mounted in a turret head 29 of generally hexagonal shape. The entire turret assembly is in turn mounted on a carriage 31 which is adapted to be traversed longitudinally with respect to the lathe spindle 13 on ways or guides 33 and 35, the travel of the carriage being controlled by a lead screw 37. As is explained in greater detail hereinafter, the turret is also mounted, relative to the carriage 31, so as to permit movement transverse to the axis of rotation of the workpiece, i.e., toward and from the viewer as illustrated in FIG. 1. Thus, a selected one of the tools 21–26, brought into operating position by the turret, may be arbitrarily positioned with respect to the rotating workpiece 17.

Referring now to FIGS. 2–4, the turret head 29, which incorporates a plurality of tool-holding sockets 41, is itself part of a spindle assembly, designated generally as 43. The head is mounted directly on a spindle shaft 44, being secured by a nut 45 and being keyed to the shaft as indicated at 47. The threaded end of shaft 44 is protected by a cap 49. The spindle assembly 43 also includes a collar-like member 54, which is keyed to the shaft 44 near its left-hand end as indicated at 53. In that the head 29, the shaft 44 and the collar member 54 are keyed, relative rotation is prevented and these elements together function as a rigid unit. As is explained in greater detail hereinafter, the collar member 54 is provided with locking surfaces which are employed in locking the head in various angular positions so as to precisely position tools held in the sockets 41.

A second collar-like member 56 is mounted on the shaft 44 near its right-hand end, being secured by nuts 58.

The spindle assembly 43 is journaled within a turret tube or cartridge member 51. This tube is also referred to hereinafter as a journal member. At the left-hand end of the tube 51, the spindle is journaled by means of a pair of opposed tapered-roller bearings 55 and 57, these bearings being preloaded by means of a ring-like cap member 59 with suitable shimming being provided as needed. The pre-loaded bearings 55 and 57 serve to accurately position the turret head end of the spindle assembly 43 with respect to the tube or journal member 51. Rocking or canting of the spindle 43 within the tube 51 is prevented by a third tapered-roller bearing 61 which operates between the other end of the tube 51 and the collar 56 at that end of the spindle 43.

The tube 51 is itself slidable within the carriage member 31, suitable scraper seals being provided as indicated at 60. Rotation of the tube 51 within the carriage member 31 is prevented by a key 62 which is mounted on the carriage member 31 and which rides in a slot 64 in the tube member. It should be noted at this point, however, that this sliding fit is not employed in the system of rotational locking which positions the turret head but rather this key way is used only for nominally preventing rotation of the tube 51 itself. The sliding movement of the tube within the carriage member is controlled by a suitable lead screw system which is a part of the lathe mechanism and is thus not shown or described in detail herein.

Between the two collar members 54 and 56 is a locking member 63 which is co-axial with the spindle shaft 44 and, as is explained in greater detail hereinafter, can slide axially relative to the spindle assembly 43 and the spindle journal tube 51. As may be seen, a sliding seal is provided between the spindle assembly 43 and the co-axial locking member 63 at two points. At the left-hand end of the locking member, a sliding seal is provided by means of O-rings 65 between the locking member and the relatively small diameter portion of the spindle shaft 44. At its right-hand end a sliding seal is provided between the locking member 63 and a larger diameter portion of the overall spindle assembly 43 by means of a hydraulic piston sealing ring 67, mounted on the collar member 56, together with a back-up O-ring 69.

The locking member 63 is slidable between two operational positions relative to the spindle 43 and the journal tube 51. The first position is the left hand or locking position and this is the position illustrated in FIG. 2. In the second position, the locking member 63 is shifted slightly to the right with respect to the spindle assembly 43 and the journal tube 51. The purpose of the locking member 63 is to prevent rotation of the spindle assembly when the locking member 63 is in its first or left-hand position. Interfitting locking surfaces are provided by a plurality of hardened steel balls 73 which interact with corresponding bores 75 and 77 in the opposed faces of the collar member 54 and locking member 63 when the locking member is in its left-hand position. As may be more easily seen in FIG. 2, the bores 75 and 77 are somewhat smaller in diameter than the balls 73 so that the engaging surfaces are essentially conical in nature. Thus, when the locking member 63 and the collar member 54 are biased toward each other, clamping the balls 73 therebetween, the balls operate to essentially lock the locking member and spindle together so that relative rotation is prevented. When the locking member 63 is in its right-hand position, however, the separation is sufficient to permit the spindle assembly 43, with its collar 54, to rotate to bring successive tool-holding sockets 41 into operative position. As will be understood, the number of matching sets of opposed bores 75 and 77 and of hardened balls 73 will be equal to the number of tool positions around the turret head 29, i.e., six in the embodiment shown.

A locating ring or race 87 is provided for maintaining each locking ball 73 generally in alignment with a respective one of the bores 77. Rotation of the ring itself is prevented by a succession of pins 89 which link the ring 87 to the locking member 63. As it is desirable that the balls 73 be free to rotate, clamping of the balls between the ring 87 and the locking member is prevented by springs 91 which bias the ring 87 away from the locking member when the locking member is moved to its right-hand or second position.

While the locking member 63 is illustrated in its left-hand or locking position, it is normally biased towards its right-hand position, as seen in FIG. 2, by means of a coil spring 79. The left-hand end of spring 79 bears against the spindle collar member 54 through an intermediate sleeve 81, while the right-hand end of the spring bears against the locking member 63 through an intermediate sleeve 83 and a ball bearing 85. The bearing prevents the applying of torque to the coil spring 79 when the spindle rotates.

The locking member 63 carries a tang 95 which is secured thereto by means of socket screws 97. The general function of the tang 95 is to prevent rotation of the locking member with respect to a relatively fixed frame of reference. As noted previously, the arrangement of the overall lathe mechanism 11 is such that the entire turret assembly, including the tube member 51 within which the turret spindle 43 is journaled, may be arbitrarily positioned with respect to the rotating workpiece 17. Accordingly, the tube 51 is not a suitably stable frame of reference for angular position. Rather, the tang passes through an opening 99 in the tube member 51 which provides liberal clearance, allowing the tube to move freely with the locking member 63 as the locking member is slid between its first and second positions relative to the spindle assembly 43. Projecting from the tube 51, the tang 95 slides between a pair of precisely ground ways 101 and 103 which are mounted on the carriage 31. Preferably the ways 101 and 103 are mounted, as illustrated in FIG. 4, in a mating tapered slot 105 in the carriage member 31 by means of pins 107 and cap screws 111, so that the clearance between the tang and the ways may be precisely adjusted. While the carriage member 31 may be movable in the sense that it moves with respect to the overall lathe assembly 11, it constitutes a relatively fixed frame of reference with respect to the movements of the turret 29 as its rotates around its axis to bring successive tools into operative operating position and also with respect to the longitudinal movement of the entire turret assembly with the journal tube 51.

As may be seen in FIG. 2, the tang 95 is provided with the central bore 113 through which hydraulic fluid may be provided under pressure to the locking member 63. For this purpose, the outer end of the bore 113 is tapped, as indicated at 115, to receive a conventional hydraulic fitting. The opposite end of the tang includes a cylindrical boss 117 which is sealed to the locking member 63 by an O-ring 119. The bore 113 communicates with the interior of the locking member 63 between the two points at which it is slidingly sealed to the coaxial spindle assembly 43.

The portion of the locking member 63 between the O-rings 65 and the piston seal 67 either provides clearance around the spindle, as indicated at 121, or incorporates passages, as indicated at 123, so that there is free hydraulic communication in this region between the two sets of sliding seals. Since the locking member 63 is slidingly sealed to the spindle assembly at portions thereof which are of different diameter, it can be seen that the locking member and spindle assembly together in effect form a hydraulic piston and cylinder in which the effective area of the piston is equal to the difference between the cross-sectional areas of the two different portions of the spindle assembly.

As noted previously, the locking member 63 is normally biased to its right-hand position by the coil spring 79. However, as may be seen in FIG. 2, movement in this direction reduces the effective volume of the hydraulic piston formed between the spindle 43 and the locking member 63. Conversely, it can thus be seen that the application of a sufficient hydraulic pressure will drive the locking member to the left as illustrated in FIG. 2, i.e., its locking position as described previously. The release of such pressure will allow the locking member to again move to its second or right-hand position under the bias of the spring 79.

A gear 131 is keyed to the end of the spindle 43 opposite the turret 29. This gear provides a means through which the spindle may be rotated, e.g., by a digital stepping motor 132, driving a meshing gear 134, to permit successive tools held in the turret head 29 to be brought into operative position when the locking member 63 is in its release or right-hand position.

In summary, the operation of the turret assembly is as follows. With the hydraulic pressure released from the interior of the locking member 63, the locking member is moved to the right by the spring 79. With the locking member in its right-hand position, the tool holding turret 29 is unlocked and may be rotated around the spindle axis, e.g., by the stepping motor 131, to any desired position so as to bring a selected tool into operating position. As may be seen, there is no constraint upon either the direction of rotation or the number of tool positions which can be incremented at one time.

Once the desired tool has been brought into position, hydraulic pressure is applied to the interior of the locking number 63, forcing it to the left so that the hardened balls 73 lock the locking member and the spindle assembly together as an effectively rigid element. Rotation of this rigid combination is prevented by the tang 95. As noted previously, the tang prevents rotation with respect to a relatively fixed frame of reference, i.e. the ways 101 and 103 which are mounted on the carriage 31. Since the axis of the spindle is positioned relative to the journal tube 51 by the pre-loaded bearings 55, 57 and 61, which do not have to accommodate any relative axial movement between the spindle and the journal member, highly accurate positioning of the selected tool is assured. Further, the absence of any axial movement of the turret spindle relative to the tube within which the spindle is journaled facilitates the elimination of foreign matter from the bearings and other locating surfaces though not all of the seals which serve this function have been described in detail. This is in contrast to the usual turret indexing systems in which the locating surfaces are relatively exposed when the turret is moved axially to release the locking system. Likewise, the absence of any bearing surfaces which must accommodate a compound movement, i.e. a combination of axial and rotational movements greatly reduces wear which would affect the accuracy of tool positioning.

Since the hardened steel balls 73 and the matching bores 75 and 77 serve only as locking surfaces and do not act as bearing surfaces during indexing of the turret, they are capable of providing an exceptionally accurate and reproduceable positioning operation. Further, since the engaging surfaces are approximately conical in nature, the long-term wearing-in or seating of these balls into the bores actually tends to improve the short-term accuracy which may be obtained over any given production or manufacturing operation. In other words, the working accuracy which can be obtained may actually tend to improve during the life of the turret rather than deteriorate. Thus, it is desirable to provide a running-in procedure during which the turret is indexed randomly from one tool position to another, so as to provide an initial seating of the balls 73 against the ends of the bores 75 and 77.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. Apparatus for accurately positioning a selected one of a plurality of operating elements at a predetermined operating position, said apparatus comprising:

a spindle adapted for rotation around a predetermined axis;

a journal member in which said spindle is journaled for rotation around said axis only, axial movement being prevented;

a locking member which is slidable, relative to said journal member axially with respect to said spindle between first and second axial positions, said locking member having a plurality of locking surfaces which are adapted to interfit with corresponding surfaces on said spindle in each of a plurality of preselected angular positions of said spindle when said locking member is in said first position, thereby to prevent relative rotation of said spindle and said locking member, relative rotation between said spindle and said locking member being permitted when said locking member is in its second said position, said locking member including also means for preventing rotation thereof with respect to a relatively fixed frame of reference;

means for defining, together with said locking member and said spindle, a hydraulic cylinder for selectively moving said locking member between its first and second positions;

a spring opposing said hydraulic cylinder; and means by which said spindle can be rotated when said locking member is in its second position, whereby successive operating elements can be brought into said operating position without relative axial movement between said spindle and said journal member.

2. Apparatus as set forth in claim 1 wherein said locking surfaces include the ends of a plurality of bores in said locking member, the ends of a matching plurality of bores in said spindle, and a matching plurality of hard spherical members coacting between the ends of respective bores in said locking member and said spindle.

3. Apparatus as set forth in claim 1 including a stepping motor for rotating said spindle when said locking member is in said second position.

4. A lathe turret comprising:

a spindle having at one end thereof a head adapted to hold a plurality of tools at respective angularly distributed positions around the spindle axis;

a tube within which said spindle is journaled for rotation around said axis, axial movement between said spindle and tube being prevented;

a support member within which said tube is axially slidable;

a locking member having a bore through which said spindle extends, the portion of said spindle passing through said locking member comprising at least two cylindrical sections of different diameters;

means providing a sliding seal between said locking member and one of said cylindrical spindle sections;

means providing a sliding seal between said locking member and the other of said cylindrical spindle sections, said locking member being movable between first and second axial positions relative to said spindle, said locking member and said spindle having interfitting surfaces which mate at a plurality of relative angular positions corresponding to the plurality of tool positions around said spindle head and which prevent relative rotation of said spindle and locking member when said locking member is in said first axial position;

spring means biasing said locking member toward one of said axial positions;

means for selectively providing hydraulic fluid under pressure between the two said seals thereby to move said locking member to the other of said axial positions;

a tang attached to said locking member and extending outside said tube;

guide means mounted on said support member for guiding said tang as said tube slides in said support member for preventing rotation of said locking member relative to a said support member, independently of said tube; and means by which said spindle can be rotated when said locking member is in its second position, whereby successive tools can be brought into an accurately predetermined operating position without axial movement of said spindle relative to said tube.

5. A lathe turret comprising:

a spindle having at one end thereof a head adapted to hold a plurality of tools at respective angularly distributed positions around the spindle axis;

a tube within which said spindle is journaled for rotation around said axis, axial movement between said spindle and tube being prevented;

a support member within which said tube is axially slidable;

a locking member having a bore through which said spindle extends, the portion of said spindle passing through said locking member comprising at least a first cylindrical section of relatively small diameter and, toward the portion of said spindle opposite said head, a second cylindrical section of relatively large diameter;

means providing a sliding seal between said locking member and said first cylindrical spindle section;

means providing a sliding seal between said locking member and said second cylindrical spindle section, said locking member being movable between first and second axial positions relative to said spindle, said spindle having also means of defining a shoulder facing said locking member, said shoulder and said locking member each having a plurality of opposing bores angularly distributed around their opposing surfaces at positions corresponding to the tool positions around said spindle head;

a plurality of locking balls each of which is adapted to engage the ends of a pair of said opposed bores in said locking member and the shoulder on said spindle when said spindle is angularly positioned to place one of said operating elements at said operating position and when said locking member is in said first position, thereby to lock said spindle against rotation relative to said locking member;

spring means biasing said locking member toward second axial position;

means for selectively providing hydraulic fluid under pressure between the two said seals thereby to move said locking member to said first axial position, thereby to selectively lock said spindle against rotation;

a tang attached to said locking member and extending outside said tube;

guide means mounted on said support member for guiding said tang as said tube slides in said support member thereby to prevent rotation of said locking member relative to a said support member, independently of said tube; and means by which said spindle can be rotated when said hydraulic pressure is released and said locking member is in its second position, whereby successive tools can be selectively brought into an accurately predetermined operating position without axial movement of said spindle relative to said tube.

6. A turret as set forth in claim 5 including a key mounted on said support member and sliding in a longitudinal slot in said tube for preventing rotation thereof.

7. A turret as set forth in claim 5 wherein said support member comprises a lathe carriage.

* * * * *